United States Patent [19]
Jackel et al.

[11] 3,940,504
[45] Feb. 24, 1976

[54] OLEOMARGARINE WITH YELLOW FOOD COLORING

[75] Inventors: Simon S. Jackel, Westport, Conn.; Mortimer J. Horn, New York, N.Y.

[73] Assignee: Baker Research Development Service, Inc., New York, N.Y.

[22] Filed: July 12, 1974

[21] Appl. No.: 488,154

[52] U.S. Cl................................ 426/540; 426/603
[51] Int. Cl.² .................................................. A23D 3/00
[58] Field of Search ........... 426/177, 250, 189, 195, 426/223, 229

[56] References Cited
UNITED STATES PATENTS

| | | | |
|---|---|---|---|
| 1,595,765 | 8/1926 | Epstein | 426/177 |
| 1,786,256 | 12/1930 | Monrad et al. | 426/177 |
| 2,042,173 | 5/1936 | Files | 426/177 |
| 2,543,250 | 2/1951 | Miller | 426/96 |
| 3,340,250 | 9/1967 | Sair et al. | 426/223 |

OTHER PUBLICATIONS

Winter, A Consumer's Dictionary of Food Additives, Crown Pub. Inc., New York, 1972, pp. 165, 169, 222.
Handbook of Food Additives, Chemical Rubber Co., Cleveland, Ohio, 1968, p. 466.
Handbook of Flavor Ingredients, Chem. Rubber Co., Cleveland, Ohio, 1971, pp. 65–66.

*Primary Examiner*—Jeanette M. Hunter
*Attorney, Agent, or Firm*—Larson, Taylor & Hinds

[57] ABSTRACT

A yellow coloring agent for foodstuffs such as oleomargarine. Oleo resin of turmeric and oleo resin of paprika, in an amount of about 10% to 100% by weight based on the weight of the turmeric, is a yellow colorant for foodstuffs. The turmeric is used in an amount sufficient to impart a desired yellow color, and paprika is added in an amount sufficient to eliminate the greenish cast which would result from the use of the turmeric alone.

4 Claims, No Drawings

OLEOMARGARINE WITH YELLOW FOOD COLORING

BACKGROUND OF THE INVENTION

This invention relates to a food colorant. More particularly, the invention relates to a yellow food colorant. Still more particularly, the invention relates to a yellow food colorant for oleomargarine.

Carotene and annatto are the coloring agents most commonly used to color oleomargarine at the present time in the United States. These colorants are used either alone or together and, while they are widely used, they cause certain off-color, particularly when concentrations are increased. For example, a typical commercial usage level of carotene is five milligrams (5 mg.) beta-carotene per pound of oleomargarine or 0.0011% by weight. Where the concentration is increased, the color becomes reddish. At a very high concentration of 0.11%, the color is orange-brown. A typical commercial level of annatto is 0.01%. At a high concentration of about 0.6%, the color is reddish brown.

Other yellow food colorants are known and have been used, both alone and in combination with other colorants, in oleomargarine. The oleo resin of turmeric, for example, has been used commercially in combination with annatto. Turmeric alone, at low concentration, produces a slight yellow color with a noticeable greenish cast and has not been used. It has been used commercially, however, in combination with annatto. At a base level of about 0.006%, the color is light yellow. At a high concentration of 0.6% the color is orange-brown.

It will be apparent from the foregoing that while the yellow colorants in common commercial use are suitable at the lower concentrations, at higher concentrations needed to deepen the yellow color, there is a tendency to produce an off-color, most notably an orange, red, or even brownish off-color.

It is an object of the present invention to provide a yellow food colorant. It is a further object to provide a yellow food colorant for oleomargarine. It is still a further object to provide a yellow food colorant which can be used in high concentration to produce deep yellow color in oleomargarine without producing an off-yellow color.

Brief Summary of the Invention

The foregoing and other objects which will be apparent to those of ordinary skill in the art are achieved according to the present invention by providing a yellow food colorant including oleo resin of turmeric and, from 10% to 100% by weight, based on the weight of the turmeric, of the oleo resin of paprika. The turmeric is used in an amount sufficient to impart yellow color, generally up to about 3% based on the weight of the oleomargarine, and the paprika is used in an amount sufficient to eliminate the greenish cast which would result from the use of the turmeric alone.

DETAILED DESCRIPTION

The following examples, while not limiting the scope of the invention, will enable those of ordinary skill in the art to make and use the invention.

EXAMPLE I

Carotene Alone

Carotene is a common ingredient used in commercial colored oleomargarine to impart a yellow color. A typical useage level is five (5) milligrams beta-carotene per pound of oleomargarine, or 0.0011%. At this level, the color is light yellow. At 0.011% the color is still yellow. At 0.11%, the color is orange-brown and at 1.1%, the color is reddish-brown. This illustrates the fact that where the concentration of carotene is substantially increased beyond recommended base levels, a very objectionable off-color is produced.

EXAMPLE II

Annatto alone

Annatto is another common ingredient used to impart yellow color to butter and colored oleomargarine. A typical useage level, for imparting yellow color is 0.01%. At a base level of 0.006%, the color is pale yellow. At 0.06%, the color is golden. At 0.6%, the color is reddish-brown. At 6.0%, the color is deep red. This illustrates that where the concentration of annatto is substantially increased beyond recommended base levels, a very objectionable off-color is produced.

EXAMPLE III

Annatto With Turmeric

Another commercial annatto product contains a small amount of turmeric blended in with the annatto. At a base level of 0.006%, the color is light yellow. At 0.06%, the color is golden. At 0.6%, the color is orange-brown. At 6.0%, the color is deep red. Results are thus substantially the same as with annatto alone.

EXAMPLE IV

Turmeric Alone

Turmeric oleo resin by itself, at 0.025% concentration imparts a light yellow color but with a greenish cast. At 0.25%, the yellowish color was enhanced and so was the greenish cast. At 2.5%, a golden color, with greenish cast, results while at 25.0%, a dark brown color is produced. These results illustrate that where turmeric is used to impart a yellow color, a noticeable greenish cast is produced.

EXAMPLE V

Paprika Alone

Paprika oleo resin by itself imparted colors not useful for oleomargarine:

| Run | Concentration | Color |
| --- | --- | --- |
| A | 0.05% | very light peach |
| B | .5% | medium peach |
| C | 1.0% | very light orange |
| D | 2.5% | light orange |

EXAMPLE VI

0.25% Turmeric Plus Paprika

The discovery was made that adding paprika oleo resin to the turmeric oleo resin already present overcomes the greenish cast and allows an attractive and appealing yellow-gold color to come through, suitable for oleomargarine even at very high and very deep levels.

| Run | Concentration | | Color |
|---|---|---|---|
| A | 0.25% Turmeric | | Light yellow color, greenish cast |
| B | " | +0.01% Paprika* | Light yellow color, lt. greenish cast |
| C | " | +0.03% Paprika | Light yellow color, no greenish cast |
| D | " | +0.05% Paprika | Lt. med. yel. color, good oleomargarine color, no greenish cast |
| E | " | +0.10% Paprika | Med. yel. color, good oleo margarine color, no greenish cast |
| F | " | +0.25% Paprika | Slightly darker yellow color than Run E, no greenish cast |

*paprika concentration is given in examples in weight % based on weight of oleomargarine These results illustrate that paprika oleo resin overcomes the greenish cast caused by the turmeric and permits an appealing yellow-gold color to come through. The amount of paprika should not, however, generally exceed the amount of turmeric since such excess amounts of paprika introduce a reddish off-color. The minimum amount of paprika needed to offset the greenish cast of the turmeric is generally about 10%.

EXAMPLE VII

Turmeric 2.5% Plus Paprika

The following results are obtained with 2.5% oleo resin of turmeric:

| Run | Concentration | | Color |
|---|---|---|---|
| A | 2.5% Turmeric | | Medium yellow color, greenish cast |
| B | " | +0.1% Paprika | Medium yellow color, lt. greenish cast |
| C | " | +0.3% Paprika | Medium yellow color, no greenish cast |
| D | " | +0.5% Paprika | Medium yellow/gold color, good oleomargarine color, no greenish cast |
| E | " | +1.0% Paprika | Deep yellow gold color - light orange cast |
| F | " | +2.5% Paprika | Light orange cast |

These results show that very high concentrations of turmeric may be used to provide good yellow color with no objectionable off color. The results also show that at higher concentrations of turmeric, it is preferred to use generally lower concentrations of paprika than may be employed at lower turmeric concentrations. Where the turmeric concentration exceeds about 2%, it is therefore preferred to keep the paprika concentration at from 10% to 50% of the turmeric concentration.

EXAMPLE VIII

Turmeric Plus 25% Paprika

The following runs are made using 25% oleo resin of paprika based on the amount of oleo resin of turmeric, the concentration of the latter being based on the margarine.

| Run | Turmeric Concentration | Color |
|---|---|---|
| A | 0.125% | Light yellow color - no greenish cast |
| B | 0.25% | Medium yellow color - no greenish cast |
| C | 0.50% | Light golden color - no greenish cast |
| D | 1.0% | Deep golden color - no greenish cast |
| E | 2.0% | Very deep golden color - no greenish cast |
| F | 3.0% | Very deep golden color - orange cast |
| G | 4.0% | Light orange color |

These results show that the maximum amount of turmeric for suitable yellow color is up to about 3% by weight, based on the margarine weight.

As indicated above, the amount of turmeric can be increased to very high levels without objectionable off-color according to the invention. This has the three fold advantage of: (1) providing an alternative yellow food colorant to those presently commercially available which could become scarce and costly due to any number of unforseen circumstances; (2) allowing increased colorant concentrations to produce deep golden yellow color without introducing off-color; and (3) permitting greater latitude in formulating. The last mentioned advantage is best understood with reference to the small quantities of colorants generally used. For example, a formulating error of an increase by a mere 5 milligrams in the amount of carotene colorant can double the amount of colorant in the margarine. Since off-colors are produced at higher carotene content, it follows that generally small formulating errors may result in an off-color product. Much greater latitude is achieved with the present invention since good color is produced at very high colorant levels.

What is claimed is:

1. An oleomargarine comprising a yellow colorant agent, the improvement wherein the yellow coloring agent comprises oleo resin of turmeric in an amount of from 0.006 to 3% by weight based on the weight of the oleomargarine and sufficient to impart to the margarine a yellow color with a greenish cast and oleo resin of paprika in an amount from 10 to 100% by weight based on the weight of the oleo resin of turmeric and sufficient to eliminate the greenish cast resulting from the use of oleo resin of turmeric alone.

2. Yellow colored oleomargarine according to claim 1 wherein the oleo resin of turmeric is present in an amount of up to about 2% by weight based on the weight of the oleomargarine.

3. Yellow colored oleomargarine according to claim 1 wherein the oleo resin of turmeric is present in an amount of up to about 1% by weight based on the weight of the oleomargarine.

4. Yellow colored margarine according to claim 1 in which the turmeric concentration is at least 2% by weight and in which the amount of paprika is from 10 to 50% by weight of the turmeric.

* * * * *